United States Patent Office 3,016,409
Patented Jan. 9, 1962

3,016,409
PREPARATION OF 1-ALKYL-1-CYCLOHEXENES
Jerome A. Vesely, Park Ridge, Ill., assignor to Universal Oil Products Company, Des Plaines, Ill., a corporation of Delaware
No Drawing. Filed Apr. 27, 1959, Ser. No. 808,878
12 Claims. (Cl. 260—666)

This invention relates to a process for preparing 1-alkyl-1-cyclohexenes and more particularly to a process for preparing 1-methyl-1-cyclohexenes.

An object of this invention is to provide a novel process for preparing 1-alkyl-1-cyclohexenes.

A further object of this invention is to provide a novel process for preparing 1-alkyl-1-cyclohexenes from a starting material which comprises isomeric alkylphenols.

One embodiment of this invention resides in a process for the preparation of a 1-alkyl-1-cyclohexene which comprises hydrogenating a mixture of isomeric alkylphenols in the presence of hydrogen and a hydrogenation catalyst at hydrogenation conditions, dehydrating the resultant isomeric alkylcyclohexanols in the presence of a dehydrating catalyst, isomerizing the resultant isomeric alkylcyclohexenes in the presence of an alkali metal catalyst to form the desired 1-alkyl-1-cyclohexenes, and recovering said 1-alkyl-1-cyclohexene.

A further embodiment of this invention resides in a process for the preparation of 1-methyl-1-cyclohexene which comprises hydrogenating a mixture of isomeric cresols in the presence of hydrogen and a hydrogenation catalyst at hydrogenation conditions, dehydrating the resultant isomeric methylcyclohexanols in the presence of alumina, isomerizing the resultant isomeric methylcyclohexenes in the presence of a sodium catalyst at a temperature in the range of from about 25° to about 75° C. to form the desired 1-methyl-1-cyclohexene, and recovering said 1-methyl-1-cyclohexene.

A still further embodiment of this invention is found in a process for the preparation of 1-methyl-1-cyclohexene which comprises hydrogenating a mixture of isomeric cresols in the presence of hydrogen and a nickel kieselguhr catalyst at hydrogenation conditions, dehydrating the resultant isomeric methylcyclohexanols in the presence of alumina, isomerizing the resultant isomeric methylcyclohexenes in the presence of a catalyst comprising sodium deposited on a precalcined high surface area solid support at a temperature in the range of from about 25° to about 75° C. to form the desired 1-methyl-1-cyclohexene, and recovering said 1-methyl-1-cyclohexene.

A specific embodiment of the invention is found in a process for the preparation of 1-methyl-1-cyclohexene which comprises hydrogenating a mixture of isomeric cresols in the presence of hydrogen and a nickel kieselguhr catalyst at hydrogenation conditions, dehydrating the resultant isomeric methylcyclohexanols in the presence of alumina, isomerizing the resultant isomeric methylcyclohexenes in the presence of a catalyst comprising sodium deposited on a precalcined high surface area alumina support at a temperature in the range of from about 25° to about 75° C. to form the desired 1-methyl-1-cyclohexene, and recovering said 1-methyl-1-cyclohexene.

Other objects and embodiments referring to alternative alkylphenols, hydrogenation catalysts and isomerization catalysts will be found in the following further detailed description of the invention.

As hereinbefore set forth this invention is drawn to a process for preparing 1-alkyl-1-cyclohexenes and particularly 1-methyl-1-cyclohexene. The aforesaid 1-methyl-1-cyclohexene in a pure state is used as an intermediate for the pyrolytic production of isoprene, said isoprene being used in the production of synthetic rubber. The starting materials for the preparation of these compounds comprises isomeric alkylphenols such as o-cresol, m-cresol, p-cresol, o-ethylphenol, m-ethylphenol, p-ethylphenol, o-propylphenol, m-propylphenol, p-propylphenol, o-isopropylphenol, m-isopropylphenol, p-isopropylphenol, o-butylphenol, m-butylphenol, p-butylphenol, o-t-butylphenol, m-t-butylphenol, p-t-butylphenol, o-amylphenol, m-amylphenol, p-amylphenol, o-isoamylphenol, m-isoamylphenol, p-isoamylphenol, etc. Thus, it is apparent that an advantage of this process resides in the fact that the isomers of the starting materials do not have to be separated before being hydrogenated and dehydrated.

In a preferred embodiment of the invention the starting materials comprising the isomeric alkylphenols and in particular the isomeric cresols are subjected to hydrogenation by passing said phenols over a hydrogenation catalyst in the presence of hydrogen. Hydrogenation catalysts which may be used in the process of this invention include metals of group VIII of the periodic table such as platinum, palladium and nickel composited on a solid support. Other catalysts which may be used include copper chromite and certain metallic oxides such as zinc oxide, copper oxide, chromium oxide, molybdenum oxide, and mixtures thereof. The hydrogenation is effected at temperatures ranging from room temperature to about 325° C. or more and at pressures ranging from 1 to about 100 atmospheres or more of hydrogen, the particular temperature and pressure being dependent upon the catalyst which is used and the alkylphenols which are undergoing hydrogenation. The resultant isomeric alkylcyclohexanols are then subjected to a dehydration step. This dehydration is effected in the presence of solid catalysts such as alumina, silica, or activated clays at an elevated temperature in the range of from about 300° to about 400° C. or more and preferably at atmospheric pressure.

The dehydrated products from the above step, comprising isomeric alkylcyclohexenes are then isomerized by passing said alkylcyclohexenes over an alkali metal catalyst at relatively low temperatures ranging from about room temperatures (25° C.) to about 200° C. or more and preferably in a range of from about 25° to about 75° C. and in the absence of any promoter.

As hereinbefore set forth the isomerization process of the present invention is preferably effected in the presence of an alkali metal disposed on a solid support. The alkali metal catalysts which are utilizable in the present process are selected from the group consisting of lithium, sodium, potassium, rubidium and cesium or mixtures thereof. Of these metals, sodium and potassium are preferred inasmuch as these two are relatively more plentiful and correspondingly less expensive to use. These alkali metals are disposed on a support in a quantity ranging from about 2 to about 20% by weight based on the support. However, not every solid support can be utilized as a satisfactory one for disposal of an alkali metal thereon. As is well known to one experienced in the art, the alkali metals react relatively violently with water and thus care must be taken to utilize this support which is relatively or substantially free from water. In most cases, this freedom from water of the support is achieved by a precalcination treatment of said support. This precalcination is carried out at a relatively high temperature in the range of from about 400° to about 700° C. and for a time sufficient to effect substantial removal of adsorbed or combined water from the support. These times will vary depending upon the support, and in addition depending upon whether the water is in a combined or in merely a physically adsorbed form. In addition to the necessity for freedom from water, the support is additionally characterized in the necessity for having a high surface area. By the term high surface area is meant a surface area measured by absorption techniques within the range of from about 25 to about 500 or more square meters per gram. For example, it has been found that certain low surface area supports such as alpha-alumina which is obviously free from combined water and which has been freed from adsorbed water is not a satisfactory support for the alkali metals in the preparation of catalysts for use in the process of this invention. Alpha-alumina is usually characterized by a surface area ranging from about 10 to about 25 square meters per gram. In contrast, gamma-alumina which has a surface area ranging from about 100 to about 300 square meters per gram, and which has been freed from adsorbed water and which contains no combined water, is a satisfactory support. Celite, a naturally occurring mineral, after precalcination, is not a satisfactory support. Celite has a surface area of from about 2 to about 10 square meters per gram. Likewise alkali metal dispersions on sand or on other low surface area silica are not satisfactory catalysts in this process. In addition, aluminas which contain combined water but which have relatively high surface areas are also not satisfactory supports. Such aluminas include dried alumina mono-hydrates which have not been sufficiently calcined to remove combined water and to form gamma-alumina. These alumina hydrates may have surface areas ranging from about 50 to about 200 square meters per gram but because they contain combined water are not satisfactory supports. Particularly preferred supports for use in preparation of catalysts for use in the process of this invention include high surface area crystalline alumina modifications such as gamma- and theta-alumina, high surface area silica, charcoals, magnesia, silica-alumina, silica-alumina-magnesia, etc. However, as is obvious from the above discussion the limitation on the use of any particular support is one of freedom from combined or adsorbed water in combination with the surface area of the support selected.

The alkali metal may be disposed on a support in any manner. One manner which has been found suitable is vaporization of the alkali metal and the passage of the vapors over the support. In this manner of preparation care must be taken to utilize relatively low temperatures since heat is given off on contact of the alkali metal with the support and since high temperatures tend to destroy the amount of surface in the support, and may also cause certain chemical reactions of the support with the alkali metal which are detrimental to catalyst activity. Sodium melts at about 97° C. and in impregnating a selected support with sodium it is preferred to carry out the impregnation or disposal of the sodium thereon at temperatures in the order of from about 100° to about 150° C. This can be accomplished for example, by melting sodium and by dropping the sodium on the support or by the passage of a stream of inert gas such as nitrogen or argon through the molten sodium and over a bed of the selected support disposed in a separate zone maintained at the desired temperature with cooling or heating means connected therewith. Potassium melts at about 62° C. and thus the impregnation of a selected support with potassium can be carried out at even lower temperatures. Potassium disposed on one of the above mentioned supports appears to be a more active catalyst for the reactions disclosed herein than does sodium and this difference in activity may be due to the lower temperatures which can be used in the disposal of potassium on the support. Supported lithium catalysts appear to be less active and this may be a reflection of the higher melting point of lithium, 186° C. and the higher temperatures which must occur on contact of the lithium with the support. Furthermore, disposal of the selected alkali metal on the support must be carried out in a manner so that the high surface of the support in combination with the alkali metal is not destroyed by incorporation of excess quantities of the alkali metal therein. In other words, the pores and passage ways of the support can be filled and blocked by addition of excess quantities of alkali metal. This is obviously undesirable and supported alkali metals containing excess alkali metal are likewise inactive in this process.

The process of the present invention is accomplished in the absence of so-called alkali metal catalyst promoters as taught by the prior art. These promoters include organic compounds which are capable of reacting with a portion of the alkali metal and thus forming organometallic compounds in situ during the residence time of the reactants in the reaction zone in the presence of the alkali metal. Heretofore it has been considered necessary to have these promoters present in order to effect the isomerization processes at so-called moderate pressures and temperatures. As hereinbefore set forth it has now been found that the presence of such promoters is not necessary and that the reaction may be carried out at relatively low temperatures and pressures by utilizing only an alkali metal disposed on a preselected support as a catalyst.

The process of this invention may be effected in any suitable manner and may comprise either a batch or a continuous type operation. For example, when a batch type operation is used a quantity of the starting material, namely, the isomeric alkylphenols along with the desired hydrogenation catalyst, are placed in a suitable apparatus which is thereafter sealed. Hydrogen is pressed in until the desired pressure has been reached and the apparatus has been heated to the desired hydrogenation temperature. Upon completion of the desired residence time the apparatus and contents thereof are cooled to room temperature, the excess pressure is vented and the desired alkylcyclohexanols are separated from the catalyst and recovered. The aforesaid isomeric alkylcyclohexanols are then placed in another apparatus containing the dehydrating catalyst and heated to a temperature in the range of from about 300° to about 400° C. Upon completion of the residence time for this step of the process the apparatus and contents thereof are cooled to room temperature and the isomeric alkylcyclohexenes are separated from the catalyst and the water and recovered. The final step of the present process is accomplished by placing the isomeric alkylcyclohexenes in another apparatus containing the isomerization catalyst comprising the alkali metal either per se or on a precalcined high surface area solid support of the type hereinbefore set forth. The apparatus is sealed and the isomerization proceeds at a temperature in the range of from about 25° to about 75° C. at atmospheric pressure. The isomerization of the isomeric alkylcyclohexenes to 1-alkyl-1-cyclohexene proceeds at a rapid rate, the usual residence time being from about two hours to about four hours. At the end of this time the desired 1-alkyl-1-cyclohexene is separated from any unreacted isomers which may be present and recovered by conventional means such as fractional distillation, crystallization, etc.

The process of this invention may also be effected in a continuous type operation. The catalysts which are used for the three steps of this process are particularly suitable for a fixed bed type of operation. In this type of operation the hydrogenation catalyst of the type hereinbefore set forth is disposed as a fixed bed in a reaction zone which may comprise either an unpacked vessel or coil or which may be lined with an adsorbent packing material such as dehydrated bauxite, fire brick, alumina and the like. The reaction zone is maintained at the proper operating conditions of temperature and pressure while the isomeric alkylphenols and hydrogen are continuously charged thereto through separate lines. In carrying out the process of this invention in a continuous manner liquid hourly space velocities (the volume of liquid alkylphenol charged to the reactor per volume of catalyst per hour) may be varied within a relatively wide range of from about 0.1 to about 20 or more, the preferred range being from about 0.1 to about 10. The desired isomeric alkylcyclohexanols resulting from the hydrogenation process are continuously withdrawn from the reaction zone, separated from the reactor effluent and charged to a second reaction zone which may be, if so desired, similar in design to the first reaction zone and which is also maintained at the proper operating conditions of temperature and pressure. The dehydration catalyst comprising silica, alumina or the like is also maintained as a fixed bed in this second reaction zone while the isomeric alkylcyclohexanols are continuously charged at liquid hourly space velocities of from about 0.1 to about 20 or more, the preferred range being the same as that hereinbefore set forth, that is, from about 0.1 to about 10. Upon completion of the dehydration step the isomeric alkylcyclohexenes are continuously withdrawn from the second reaction zone, separated from the reactor effluent and charged to a third reaction zone which may be similar to the first two zones. In this zone which is likewise maintained at the proper operating conditions of temperature and pressure the isomerization catalyst comprising either a metallic alkali metal or an alkali metal disposed on a precalcined high surface area solid support is placed in the zone as a fixed bed. The isomeric alkylcyclohexenes are continuously charged to this third reaction zone at liquid hourly space velocities similar to those hereinbefore set forth. The desired 1-alkyl-1-cyclohexene is continuously withdrawn from this third reaction zone, separated from the reactor effluent and purified by conventional means hereinbefore set forth while said effluent, like those of the first two steps, is recharged to the reaction zone as a portion of the feed material.

Other continuous types of operation which may be used in this process include the compact moving bed type of operation in which the bed of catalyst and the reactants pass either concurrently or countercurrently to each other in the reaction zone and the slurry type process in which the catalyst is carried into the reaction zone as a slurry in the reactant.

The following examples are given to illustrate the process of the present invention which, however, are not intended to limit the generally broad scope of the present invention in strict accordance therewith.

*Example I*

In this example 100 g. of a mixture of isomeric cresols were placed in the glass liner of a rotating autoclave along with 10 g. of a nickel kieselguhr catalyst. Approximately 100–125 atmospheres of hydrogen were pressed into the glass liner of the autoclave and the autoclave was heated to a temperature of about 175° C. The autoclave was repressured with hydrogen as needed and was maintained at this temperature until hydrogen was no longer absorbed as indicated by constant pressure. The autoclave and contents thereof were then cooled to room temperature. The excess pressure was vented and the reaction product, comprising isomeric methylcyclohexanols was separated from the catalyst.

The isomeric methylcyclohexanols were then passed over an alumina dehydrating catalyst at 300–325° C. in a vertical furnace. The effluent was condensed and the methylcyclohexenes recovered by conventional means. Undehydrated methylcyclohexanols recovered, can be re-passed over the catalyst.

Thirty-one grams of dry isomeric methylcyclohexenes which have been prepared according to the above steps were then placed in the glass liner of a rotating autoclave along with 4.2 g. of metallic sodium. The autoclave was then heated to a temperature of 185–200° C. and maintained thereat for a period of from about 2 to 4 hours. At the end of this time the autoclave and contents thereof were cooled to room temperature. The reaction product was subjected to fractional distillation, the desired 1-methyl-1-cyclohexene being recovered in a 70% yield.

*Example II*

In this example the isomeric methylcyclohexenes were prepared in a manner similar to that set forth in Example I above. The isomeric methylcyclohexenes are then isomerized in a continuous process by passing said isomers over a high surface sodium catalyst at a temperature ranging from 25° to about 75° C. and a liquid hourly space velocity of from 0.5 to 8.0. The catalyst comprises sodium composited on a precalcined high surface area alumina support, said catalyst containing about 12.5% by weight of sodium based on the alumina. The desired 1-methyl-1-cyclohexene in a yield of approximately 96% is separated and recovered from any isomers thereof.

*Example III*

An isomerization catalysts was prepared by calcining about 50.7 g. of silica gel for two hours at a temperature of about 650° C. and placed, while still hot, in a 500 cc. three-necked flask. A stream of nitrogen was passed through the flask to provide an inert atmosphere. When the temperature had dropped to about 150° C., 9 g. of sodium was added to the stirred mixture, the temperature rising to about 200° C. The resultant sodium-silica catalyst was a uniform black color and contained about 15% by weight of sodium based on the silica.

A mixture of isomeric methylcyclohexenes which are prepared in a manner similar to that set forth in Example I above are passed over the isomerization catalyst prepared according to the preceding paragraph and comprising sodium disposed on a precalcined high surface area silica support at a temperature of from 25° to 75° C. and a liquid hourly space velocity of from 0.5 to 8.0. The desired 1-methyl-1-cyclohexene is separated and recovered by fractional distillation in a yield of approximately 96%.

I claim as my invention:

1. A process for the preparation of a 1-alkyl-1-cyclohexene which comprises hydrogenating a mixture of isomeric alkylphenols in the presence of hydrogen and a hydrogenation catalyst at hydrogenation conditions, dehydrating the resultant isomeric alkylcyclohexanols in the presence of a dehydrating catalyst, isomerizing the resultant isomeric alkylcyclohexenes in the presence of an alkali metal catalyst to form the desired 1-alkyl-1-cyclohexene, and recovering said 1-alkyl-1-cyclohexene.

2. A process for the preparation of a 1-alkyl-1-cyclohexene which comprises hydrogenating a mixture of isomeric alkylphenols in the presence of hydrogen and a hydrogenation catalyst at hydrogenation conditions, dehydrating the resultant isomeric alkylcyclohexanols in the presence of alumina, isomerizing the resultant isomeric alkylcyclohexenes in the presence of an alkali metal catalyst at a temperature in the range of from about 25° to about 75° C. to form the desired 1-alkyl-1-cyclohexene, and recovering said 1-alkyl-1-cyclohexene.

3. A process for the preparation of a 1-alkyl-1-cyclohexene which comprises hydrogenating a mixture of isomeric alkylphenols in the presence of hydrogen and a hydrogenation catalyst at hydrogenation conditions, dehydrating the resultant isomeric alkylcyclohexanols in the presence of alumina, isomerizing the resultant isomeric alkylcyclohexenes in the presence of a sodium catalyst at a temperature in the range of from about 25° to about 75° C. to form the desired 1-alkyl-1-cyclohexene, and recovering said 1-alkyl-1-cyclohexene.

4. A process for the preparation of 1-methyl-1-cyclohexene which comprises hydrogenating a mixture of isomeric cresols in the presence of hydrogen and a hydrogenation catalyst at hydrogenation conditions, dehydrating the resultant isomeric methylcyclohexanols in the presence of alumina, isomerizing the resultant isomeric methylcyclohexenes in the presence of a sodium catalyst at a temperature in the range of from about 25° to about 75° C. to form the desired 1-methyl-1-cyclohexene, and recovering said 1-methyl-1-cyclohexene.

5. A process for the preparation of a 1-ethyl-1-cyclohexene which comprises hydrogenating a mixture of isomeric ethylphenols in the presence of hydrogen and a hydrogenation catalyst at hydrogenation conditions, dehydrating the resultant isomeric ethylcyclohexanols in the presence of alumina, isomerizing the resultant isomeric ethylcyclohexenes in the presence of a sodium catalyst at a temperature in the range of from about 25° to about 75° C. to form the desired 1-ethyl-1-cyclohexene, and recovering said 1-ethyl-1-cyclohexene.

6. A process for the preparation of a 1-propyl-1-cyclohexene which comprises hydrogenating a mixture of isomeric propylphenols in the presence of hydrogen and a hydrogenation catalyst at hydrogenation conditions, dehydrating the resultant isomeric propylcyclohexanols in the presence of alumina, isomerizing the resultant isomeric propylcyclohexenes in the presence of a sodium catalyst at a temperature in the range of from about 25° to about 75° C. to form the desired 1-propyl-1-cyclohexene, and recovering said 1-propyl-1-cyclohexene.

7. A process for the preparation of 1-methyl-1-cyclohexene which comprises hydrogenating a mixture of isomeric cresols in the presence of hydrogen and a nickel kieselguhr catalyst at hydrogenation conditions, dehydrating the resultant isomeric methylcyclohexanols in the presence of alumina, isomerizing the resultant isomeric methylcyclohexenes in the presence of a sodium catalyst at a temperature in the range of from about 25° to about 75° C. to form the desired 1-methyl-1-cyclohexene, and recovering said 1-methyl-1-cyclohexene.

8. A process for the preparation of 1-methyl-1-cyclohexene which comprises hydrogenating a mixture of isomeric cresols in the presence of hydrogen and a nickel kieselguhr catalyst at hydrogenation conditions, dehydrating the resultant isomeric methylcyclohexanols in the presence of alumina, isomerizing the resultant isomeric methylcyclohexenes in the presence of a catalyst comprising metallic sodium at a temperature in the range of from about 25° to about 75° C. to form the desired 1-methyl-1-cyclohexene, and recovering said 1-methyl-1-cyclohexene.

9. A process for the preparation of 1-methyl-1-cyclohexene which comprises hydrogenating a mixture of isomeric cresols in the presence of hydrogen and a nickel kieselguhr catalyst at hydrogenation conditions, dehydrating the resultant isomeric methylcyclohexanols in the presence of alumina, isomerizing the resultant isomeric methylcyclohexenes in the presence of a catalyst comprising sodium deposited on a precalcined high surface area solid support at a temperature in the range of from about 25° to about 75° C. to form the desired 1-methyl-1-cyclohexene, and recovering said 1-methyl-1-cyclohexene.

10. A process for the preparation of 1-methyl-1-cyclohexene which comprises hydrogenating a mixture of isomeric cresols in the presence of hydrogen and a nickel kieselguhr catalyst at hydrogenation conditions, dehydrating the resultant isomeric methylcyclohexanols in the presence of alumina, isomerizing the resultant isomeric methylcyclohexenes in the presence of a catalyst comprising sodium composited on a precalcined high surface area alumina support at a temperature in the range of from about 25° to about 75° C. to form the desired 1-methyl-1-cyclohexene, and recovering said 1-methyl-1-cyclohexene.

11. A process for the preparation of 1-methyl-1-cyclohexene which comprises hydrogenating a mixture of isomeric cresols in the presence of hydrogen and a nickel kieselguhr catalyst at hydrogenation conditions, dehydrating the resultant isomeric methylcyclohexanols in the presence of alumina, isomerizing the resultant isomeric methylcyclohexenes in the presence of a catalyst comprising sodium composited on a precalcined high surface area charcoal support at a temperature in the range of from about 25° to about 75° C. to form the desired 1-methyl-1-cyclohexene, and recovering said 1-methyl-1-cyclohexene.

12. A process for the preparation of 1-methyl-1-cyclohexene which comprises hydrogenating a mixture of isomeric cresols in the presence of hydrogen and a nickel kieselguhr catalyst at hydrogenation conditions, dehydrating the resultant isomeric methylcyclohexanols in the presence of alumina, isomerizing the resultant isomeric methylcyclohexenes in the presence of a catalyst comprising sodium composited on a precalcined high surface area silica support at a temperature in the range of from about 25° to about 75° C. to form the desired 1-methyl-1-cyclohexene, and recovering said 1-methyl-1-cyclohexene.

References Cited in the file of this patent

UNITED STATES PATENTS

| | | |
|---|---|---|
| 2,328,719 | Houghton et al. | Sept. 7, 1943 |
| 2,804,489 | Pines et al. | Aug. 27, 1957 |
| 2,866,831 | Lambert et al. | Dec. 30, 1958 |
| 2,891,096 | Clingman | June 16, 1959 |
| 2,891,097 | Clingman | June 16, 1959 |

FOREIGN PATENTS

| | | |
|---|---|---|
| 451,535 | Germany | Oct. 28, 1927 |